(12) United States Patent
Kuramochi et al.

(10) Patent No.: US 7,095,177 B2
(45) Date of Patent: Aug. 22, 2006

(54) EL LIGHT EMITTING UNIT, POWER FEEDING UNIT AND EL LIGHT EMITTING DEVICE

(75) Inventors: Mitsuru Kuramochi, Minato-ku (JP); Akira Shibasaki, Minato-ku (JP)

(73) Assignee: Riso Kagaku Corporation, Tokyo (JP)

( * ) Notice: Subject to any disclaimer, the term of this patent is extended or adjusted under 35 U.S.C. 154(b) by 7 days.

(21) Appl. No.: 10/923,896

(22) Filed: Aug. 24, 2004

(65) Prior Publication Data

US 2005/0093480 A1    May 5, 2005

(30) Foreign Application Priority Data

Aug. 26, 2003    (JP)    ............................ P2003-301698

(51) Int. Cl.
*H01J 7/44* (2006.01)
(52) U.S. Cl. .......................................... 315/57; 315/70
(58) Field of Classification Search ................ 315/57, 315/70, 246, 248, 276, 283; 361/35, 38; 336/199
See application file for complete search history.

(56) References Cited

U.S. PATENT DOCUMENTS

| | | | |
|---|---|---|---|
| 4,208,869 A | * | 6/1980 | Hanaoka ....................... 368/84 |
| 5,144,203 A | * | 9/1992 | Fujita et al. ................ 315/169.3 |
| 6,636,190 B1 | * | 10/2003 | Hirakata et al. ............. 345/74.1 |

FOREIGN PATENT DOCUMENTS

JP    2002-215069 A    7/2002

* cited by examiner

*Primary Examiner*—Thuy Vinh Tran
(74) *Attorney, Agent, or Firm*—Sughrue Mion, PLLC

(57) ABSTRACT

EL light emitting device includes a cylindrical EL light emitting unit and a columnar power feeding unit. EL light emitting unit is composed such that a cylindrical receiver coil is arranged and connected along an inner circumferential face of the cylindrical EL light emitting element and integrated into a single body by an outer cover member. The power feeding unit is formed in a columnar shape whose diameter is smaller than an inner diameter of EL light emitting unit so that the power feeding unit can be inserted into the cylindrical EL light emitting unit. When the power feeding unit is inserted into EL light emitting unit and the power feeding unit is impressed with an alternating voltage, a high alternating voltage corresponding to the turn rate of both coils is generated in the receiver coil, so that light can be emitted from EL light emitting element.

16 Claims, 12 Drawing Sheets

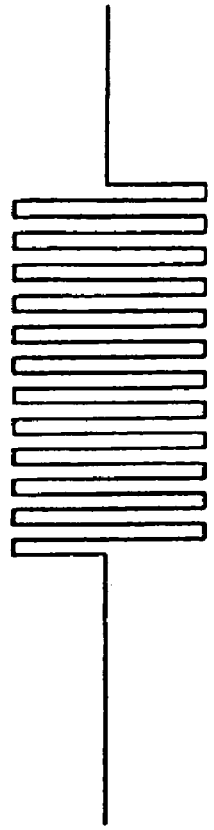
FIG. 4A WAVE FORM FOR DRIVING FEEDER COIL
FIG. 4B OUTPUT OF CURRENT DETECTION CIRCUIT
FIG. 4C OUTPUT OF F/F CIRCUIT FOR HOLDING (DRIVE CONTROL)
FIG. 4D WAVE FORM GENERATED IN RECEIVER COIL
FIG. 4E ACTION OF EL LIGHT EMITTING ELEMENT

EL LIGHT EMITTING UNIT, POWER FEEDING UNIT AND EL LIGHT EMITTING DEVICE

The present application is based on Japanese Patent Application No. 2003-301698, the entire contents of which are incorporated herein by reference.

BACKGROUND OF THE INVENTION

1. Field of the Invention

The present invention relates to an EL light emitting device for driving an EL light emitting element so that the EL light emitting element can emit light when electric power is electromagnetically induced in a receiver coil by supplying an electric current to a feeder coil. Further, the present invention relates to an EL light emitting unit having a receiver coil and an EL light emitting element effectively used for the EL light emitting device. Furthermore, the present invention relates to a power feeding unit having a feeder coil and a power feeding section.

2. Description of Related Art

The EL light emitting element is a self-light-emitting element characterized in that the thickness is small and the visibility is high. Therefore, it is expected that the EL light emitting element will be applied to various uses. In fact, the EL light emitting element is put into practical use in some technical fields.

For example, Japanese Patent Publication No. JP-A-2002-215069 discloses an electric decoration poster on which displaying is conducted by the combination of an EL element light emitting body with a film. In this electric decoration poster, the EL element light emitting body and the film are combined with each other, and an image on the film is distinctly seen when light is emitted from the EL element light emitting body.

In general, in some cases, the use of the EL element in the open air, which includes the electric decoration poster disclosed in JP-A-2002-215069, is limited, and further the use of the EL element to a toy is limited for the reasons of safety.

Specifically, the problems are described as follows. Since a high voltage is required for driving the EL element and the driving is conducted by AC power, it is necessary to pay the maximum attention to the prevention of an electric shock caused by an imperfect circuit, wiring or connecting section.

Concerning the means for supplying power to the EL element, it is common to use the means of using a connector or socket or the means of soldering, that is, it is common to use the means of supplying power by a mechanical contact. When the above means are adopted, mechanical stress is concentrated on the connecting portion in which the EL element is connected to the electrode section.

SUMMARY OF THE INVENTION

It is an object of the present invention to provide an EL light emitting device in which the EL element and the power feeding section for making the EL element emit light are mechanically separate from each other so as to solve the problem of mechanical stress given to the electrode portion of the EL element which becomes a connecting portion, so that the problems of short circuit and breaking of wire can be solved, and further when the EL element and the power feeding section are provided separately from each other, the EL element itself can be tightly sealed and an accident of electric shock caused by a high voltage can be avoided. Due to the foregoing, the EL light emitting device of the invention can be applied to various uses.

(1) An EL light emitting unit of the invention comprises: an EL light emitting element; and a power receiving coil connected to the EL light emitting element, in which a predetermined AC current is induced by electromagnetic induction, wherein the EL light emitting element and the power receiving coil are integrated with each other into a single body, and the EL light emitting element and power receiving coil are entirely sealed by an outer cover member.

(2) In the invention, wherein the EL light emitting element may be formed in a cylindrical shape, the power receiving coil is formed in a cylindrical shape being arranged along an inner circumferential face of the EL light emitting element and the outer cover member is formed in a cylindrical shape capable of covering entirely the EL light emitting element and power receiving element.

(3) In the invention, the EL light emitting element may be formed in a sheet-shape, the power receiving coil is arranged along a surface of the EL light emitting element and the outer cover member is formed in a sheet-shape capable of covering entirely the EL light emitting element and power receiving element.

(4) In the invention, the power receiving coil may be formed in an annular body, the EL light emitting element is formed in an annular-shape along the power receiving coil so that the EL light emitting element can cover a surface of the annular body of the power receiving coil.

(5) In the invention, the EL light emitting element may include: a central electrode provided on a surface of the annular body of the power receiving coil via an insulating layer; a light emitting layer provided on a surface of the central electrode via an insulating layer; a transparent electrode provided on a surface of the light emitting layer via an insulating layer; an additional electrode wound around a surface of the transparent electrode; and an outer cover member for covering the transparent electrode and the additional electrode, wherein one end of the power receiving coil is connected to the central electrode, and another end of the power receiving coil is connected to the additional electrode.

(6) In the invention, the EL light emitting element, which is formed in a linear structure, may includes: an annular central electrode; a light emitting layer provided on a surface of the central electrode via an insulating layer; a transparent electrode provided on a surface of the light emitting layer via an insulating layer; an additional electrode wound around a surface of the transparent electrode; and an outer cover member for covering the transparent electrode and the additional electrode, wherein the EL light emitting element is densely arranged in the circumferential direction on a surface of the annular body of the power receiving coil, one end of the power receiving coil is connected to the central electrode of the EL light emitting element, another end of the power receiving coil is connected to the additional electrode of the EL light emitting element, and the EL light emitting element and the power receiving coil are covered with an outer cover member.

(7) Another power feeding unit of the invention comprises: a power feeding coil for inducing a predetermined AC current in the power receiving coil, which is connected to the EL light emitting element, by electromagnetic induction; and a power feeding section for giving an AC current to the power feeding coil.

(8) In the invention, wherein the power feeding coil is formed in a columnar shape, whose diameter is smaller than the inner diameter of the power receiving coil so that the power feeding coil is insertable into the power receiving coil which is formed in a cylindrical shape.

(9) In the invention, the power feeding coil may be wound around a magnetic body having a recess portion in which a part of the sheet-shaped power receiving coil, which is wound on a plane, is arranged.

(10) In the invention, the power feeding coil may be wound around a split of a cylindrical core, which can be attached from the outside, so that the power feeding coil is movable with respect to the power receiving coil formed in an annular body.

(11) In the invention, the power feeding section may be configured to intermittently drive the power feeding coil, and the power feeding coil may be continuously driven in a case that the power receiving coil and the power feeding coil come close to each other, in which an electric current not less than or more than a predetermined value flows in the power feeding coil.

(12) Another EL light emitting device of the invention comprises:

an EL light emitting unit in which the EL light emitting element and the power receiving coil, which is connected to the EL light emitting element and induces a predetermined AC current by electromagnetic induction, are integrated with each other into a single body; and a power feeding unit having a power feeding coil, which induces a predetermined AC current in the power receiving coil of the EL light emitting unit by electromagnetic induction, and having a power feeding section for giving an AC current to the power feeding coil.

(13) In the invention, the EL light emitting unit is composed such that the EL light emitting element is formed in a cylindrical shape, the power receiving coil is formed in a cylindrical shape being arranged along an inner circumferential face of the EL light emitting element, and the EL light emitting element and the power receiving coil are integrated with each other into a single body by a cylindrical outer cover member, and the power feeding unit is composed such that the power feeding coil is formed in a cylindrical shape, whose diameter is smaller than the inner diameter of the power receiving coil so that the power feeding coil is insertable into the power receiving coil formed in a cylindrical shape.

(14) In the invention, the EL light emitting unit may be composed such that the EL light emitting element is formed in a sheet-shape, the power receiving coil is arranged along a surface of the EL light emitting element, and the EL light emitting element and the power receiving coil are integrated with each other into a single body by a sheet-shaped outer cover member, and the power feeding unit may be composed such that the power feeding coil is wound around a magnetic body having a recess portion in which a part of the power receiving coil is arranged, and the magnetic body is attracted to a magnetic body for coupling magnetic fields, which is arranged on the other face of the EL light emitting unit with respect to the EL light emitting unit, by a magnetic force so that a part of the power receiving coil can be arranged in a recess portion of the magnetic body arranged on the other face of the EL light emitting unit.

(15) In the invention, the EL light emitting unit may be composed such that the EL light emitting element includes a central electrode provided on a surface of the annular body of the power receiving coil, which is formed in an annular body, via an insulating layer, a light emitting layer provided on a surface of the central electrode via an insulating layer, a transparent electrode provided on a surface of the light emitting layer via an insulating layer, an additional electrode wound around a surface of the transparent electrode and an outer cover member for covering the transparent electrode and the additional electrode, and further one end of the power receiving coil is connected to the central electrode and another end of the power receiving coil is connected to the additional electrode, and the power feeding unit may be composed such that the power feeding coil is wound around a split of a cylindrical core capable of being attached from the outside so as to be movable with respect to the annular EL light emitting unit.

(16) In the invention the EL light emitting unit may be composed such that the EL light emitting element, which is formed in a linear structure, includes an annular central electrode, a light emitting layer provided on a surface of the central electrode via an insulating layer, a transparent electrode provided on a surface of the light emitting layer via an insulating layer, an additional electrode wound around a surface of the transparent electrode, and an outer cover member for covering the transparent electrode and the additional electrode, the EL light emitting element is densely arranged in the circumferential direction on a surface of the annular body of the power receiving coil, one end of the power receiving coil is connected to the central electrode of the EL light emitting element, another end of the power receiving coil is connected to the additional electrode of the EL light emitting element, and the EL light emitting element and the power receiving coil are covered with an outer cover member, the power feeding unit may be composed such that the power feeding coil is wound around a split of a cylindrical core capable of being attached from the outside so as to be movable with respect to the annular EL light emitting unit.

(17) In the invention, a ratio of the number of turns of the power feeding coil to that of the power receiving coil may be not less than 1 to 10.

According to the EL light emitting unit of the invention, the following advantages can be provided. The EL light emitting element and the power feeding section for making the EL light emitting element emit light are mechanically separate from each other, that is, no electrical contact portion is provided between the EL light emitting element and the power feeding section. Therefore, no mechanical stress is given to the electrode portion of the EL light emitting element which becomes a connecting portion, and the problems of short circuit and breaking of wire can be solved. Since the EL light emitting element is separate from the power feeding section, the EL light emitting element itself can be made compact and tightly sealed together with the receiver coil. Accordingly, there is no possibility of the occurrence of an accident of electric shock caused by a high voltage. Therefore, the EL light emitting unit of the invention can be applied to various uses.

According to the EL light emitting unit of the invention, in addition to the above advantages, the EL light emitting unit can be formed in a cylindrical shape, and an outer circumferential face of the cylinder is used as a display face on which an image is displayed by the EL light emitting element. Therefore, the EL light emitting unit can be applied to various uses.

According to the EL light emitting unit of the invention, the EL light emitting unit can be formed in a sheet-shape, and a large plane of the sheet is used as a display face on which an image is displayed by the EL light emitting element. Therefore, the EL light emitting unit can be applied to various uses.

According to the EL light emitting unit of the invention, the EL light emitting unit can be formed in an annular shape, and an entire circumferential face of the annular body is used as a display face on which an image is displayed by the EL light emitting element. Therefore, the EL light emitting unit can be applied to various uses.

According to the EL light emitting unit of the invention, the EL light emitting element can be integrally formed on a surface of the annular body of the receiver coil.

According to the EL light emitting unit of the invention, the linear shaped EL light emitting element can be densely arranged in the periphery of the receiver coil so that the linear shaped EL light emitting element can be covered by the outer cover member and integrated into a single body. Therefore, it is possible to manufacture the EL light emitting unit when a previously manufactured linear shaped EL light emitting element is appropriately used.

The power feeding unit of the invention provides the following advantages. The power feeding unit and the EL light emitting element, to which power is supplied from the power feeding unit, are mechanically separate from each other, so that the electrical contact portion can be avoided. Therefore, the problems of mechanical stress given to the electrode portion of the EL element, which becomes a connecting portion, can be solved, and the problems of short circuit and breaking of wire can be also solved. Due to the foregoing, the EL light emitting element of the invention can be applied to various uses.

The power feeding unit of the invention can also provide the following advantages. When the power feeding coil is inserted into the cylindrical receiver coil, the light emitting display of the cylindrical EL light emitting element can be turned on and off. Therefore, the EL light emitting element can be applied to various uses appropriate to the above action of the power feeding unit.

The power feeding unit of the invention also provides the following advantages. When a part of the sheet-shaped receiver coil is covered with a recess portion of the magnetic body, the light emitting display of the sheet-shaped EL light emitting element can be turned on and off. Therefore, the EL light emitting element can be applied to various uses appropriate to the above action of the power feeding unit.

According to the power feeding unit of the invention, the following advantages can be provided. The feeder coil can be attached from the outside so as to be movable with respect to the receiver coil formed in an annular body.

According to the power feeding unit, the following advantages can be provided. In the case where the receiver coil does not come close to the feeder coil, power is economized by intermittently driving the feeder coil. In case where the receiver coil comes close, it is immediately detected so as to maintain the drive of the feeder coil.

According to the EL light emitting unit of the invention, the following advantages can be provided. The EL light emitting element and the power feeding unit for making the EL light emitting element emit light are mechanically separate from each other, that is, no electrical contact portion is provided between the EL light emitting element and the power feeding unit. Therefore, no mechanical stress is given to the electrode portion of the EL light emitting element which becomes a connecting portion, and the problems of short circuit and breaking of wire can be solved. Since the EL light emitting unit is separate from the power feeding unit, the EL light emitting element itself can be made compact and tightly sealed together with the receiver coil. Accordingly, there is no possibility of the occurrence of an accident of electric shock caused by a high voltage. Therefore, the EL light emitting element of the invention can be applied to various uses. Since the EL light emitting unit and the power feeding unit are separate from each other, according to the use of the EL light emitting element, the shapes, structures and relative actions of both the EL light emitting unit and the power feeding unit can be changed, that is, a large number of variations can be made.

According to the EL light emitting device of the invention, the following advantages can be provided. When the power feeding unit of a small diameter is inserted into and drawn out from the receiver coil, the outer circumferential face of the cylinder of which is a displaying face of the EL light emitting element, under the condition that the power feeding unit is made to come close to the inside of the receiver coil, the light emitting display of the cylindrical EL light emitting element can be turned on and off. Therefore, the EL light emitting element can be applied to various uses suitable for the above cylindrical structure and the inserting and drawing out action.

According to the EL light emitting device of the invention, the following advantages can be provided. When a part of the receiver coil, which is provided on the displaying face of the sheet-shaped EL light emitting element, is covered with a recess portion of the magnetic body, while a portion in which the feeder coil and the receiver coil are tightly contacted with each other is kept small, a plane-shaped light emission of the EL light emitting element concerned can be turned on and off. The present invention can provide the EL light emitting element suitable for the plane-shaped structure and the action of putting the faces together.

According to the EL light emitting device, the following advantages can be provided. With respect to the annular EL light emitting unit in which the EL light emitting elements are provided on the entire face in the periphery of the annular power receiving coil, the cylindrical power feeding unit is provided being inserted into the annular EL light emitting unit. Therefore, the power feeding unit can be attached at an arbitrary position with respect to the EL light emitting unit. Since the annular EL light emitting unit itself emits light from the entire face, the EL light emitting element can be provided to various uses suitable for the above structure and the action of emitting light from the entire face of the annular body. Further, it is unnecessary to previously manufacture a linear EL light emitting element, and it is possible to manufacture such that the EL light emitting element is directly woven into in the periphery of the receiver coil.

According to the EL light emitting device, the following advantages can be provided. Into the EL light emitting unit in which the linear EL light emitting elements are densely arranged on the entire face in the periphery of the annular power receiving coil, the cylindrical power feeding unit is movably inserted. Therefore, the power feeding unit can be attached at an arbitrary position with respect to the EL light emitting unit, and the annular EL light emitting unit itself emits light from the entire face. Therefore, the EL light emitting element can be provided to various uses suitable for the above structure and the action in which light is emitted from the entire face of the annular body. Further, the lamination structure of the EL light emitting element is not directly woven into the periphery of the receiver coil but the thin EL light emitting element, which has been previously manufactured, is appropriately used. Therefore, the manufacture is simple.

According to the EL light emitting device of the invention, the following advantages can be provided. When the ratio of the number of turns of the feeder coil to that of the receiver coil is appropriately set, it is possible to generate an AC voltage higher than the drive voltage of the feeder coil. Therefore, it is possible to drive an EL light emitting element which requires a higher AC drive voltage.

BRIEF DESCRIPTION OF THE DRAWINGS

FIGS. 4A through 4E are views showing wave-forms of portions in EL light emitting device of the first embodiment at the time of driving;

DETAILED DESCRIPTION OF THE PREFERRED EMBODIMENTS

Explanations will be made into the embodiments of the invention which the patent applicant thinks to be the best at the point of time of making the application.

(1) First Embodiment (FIGS. 1 to 4)

Figure 1:
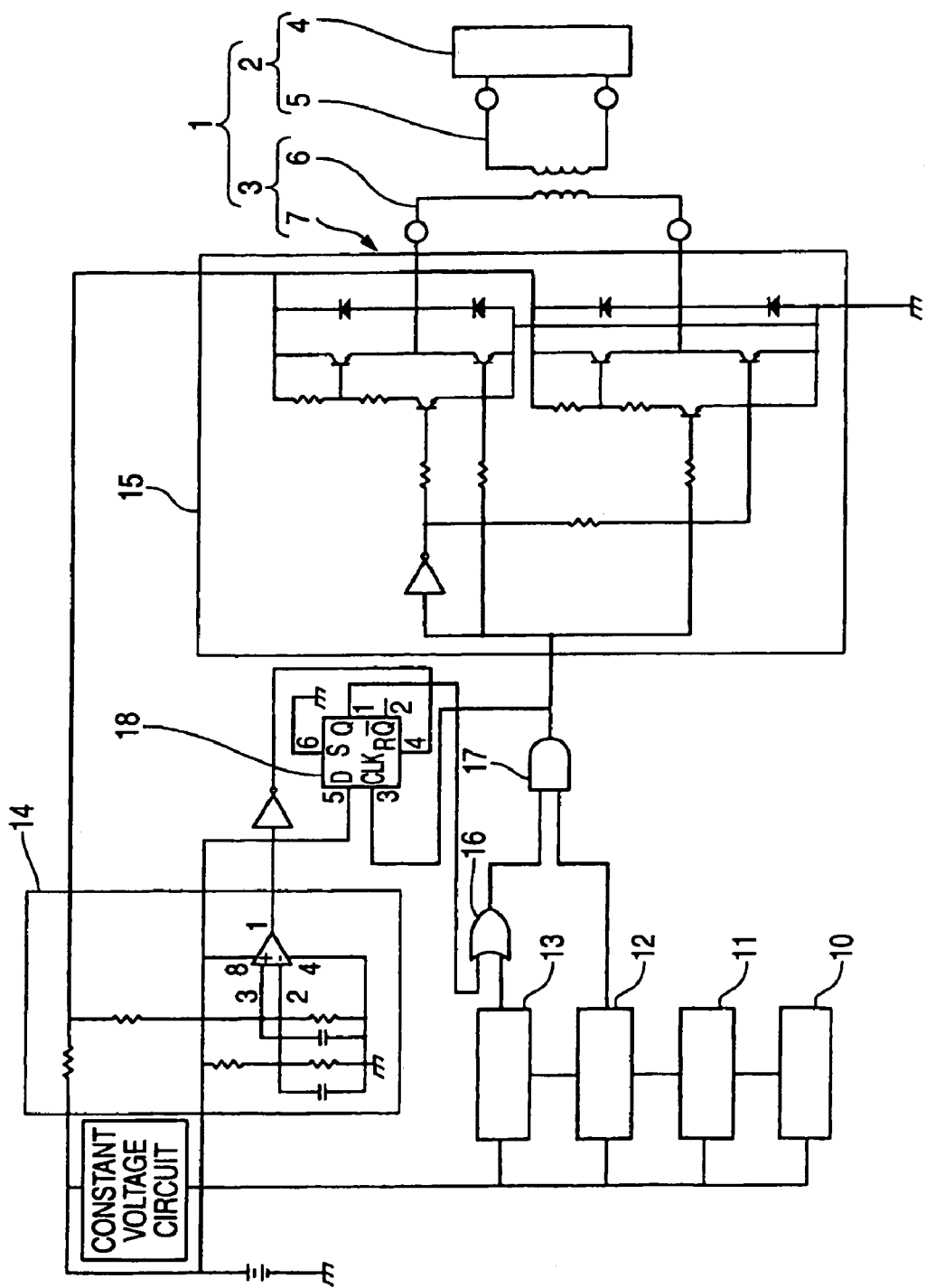
FIG. 1 is a circuit diagram showing a structure of EL light emitting device of the first embodiment.

FIG. 1 is a circuit diagram showing the structure of the EL light emitting device 1 of the present embodiment.

The EL light emitting device 1 of the present embodiment includes: a cylindrical EL light emitting unit 2; and a columnar power feeding unit 3, which is composed separately from the cylindrical EL light emitting unit 2, not mechanically connected to the cylindrical EL light emitting unit.

The EL light emitting unit 2 includes: an EL light emitting element 4 (In this case, "light emitting" includes the meaning of "displaying".); and a receiver coil 5, which is connected to the EL light emitting element 4, in which a predetermined AC current is induced by electromagnetic induction. The power feeding unit 3 includes: a feeder coil 6 for inducing a predetermined AC current in the receiver coil 5 of the EL light emitting unit 2 by electromagnetic induction; and a power feeding section 7 for giving an AC current to the feeder coil 6.

Figure 2:
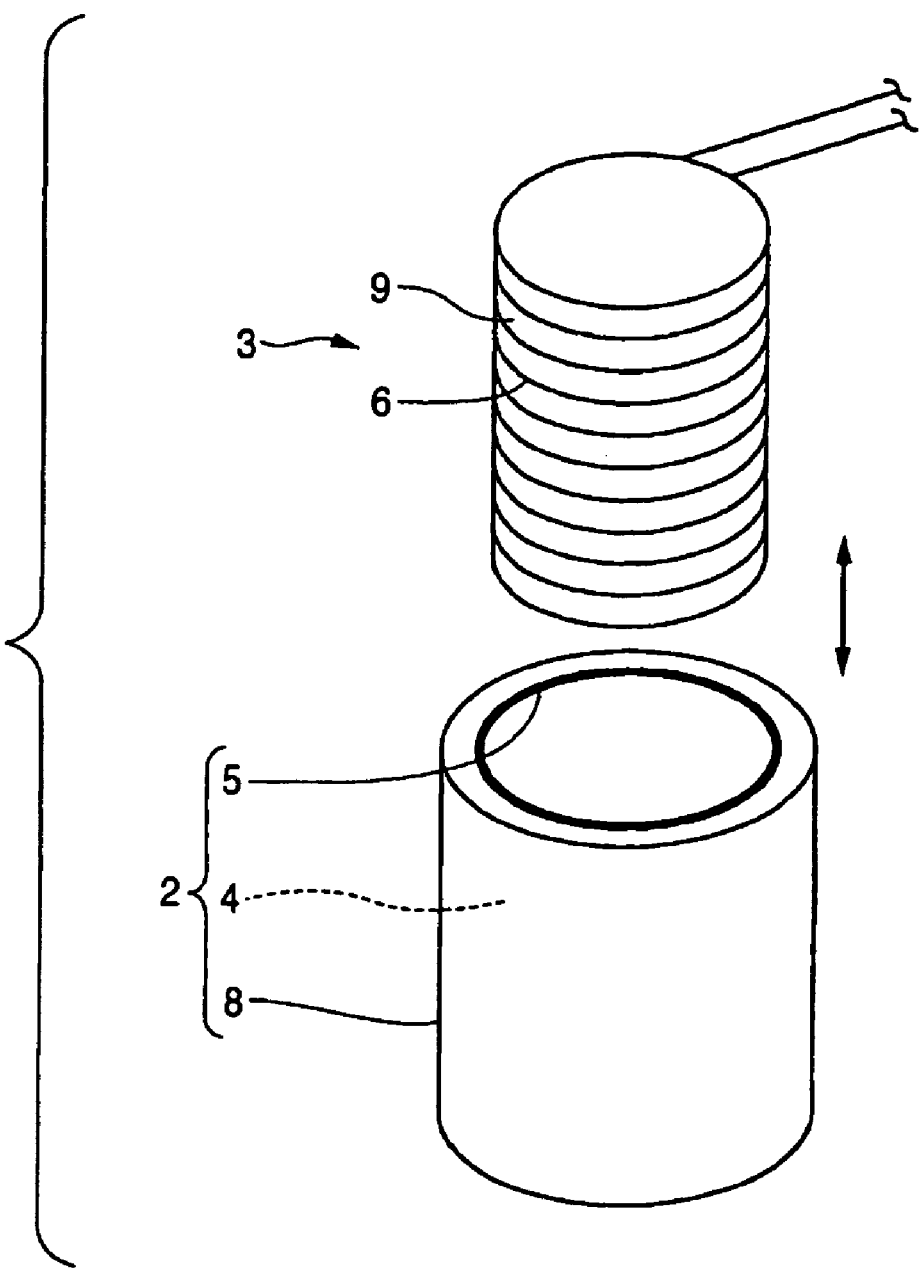
FIG. 2 is a perspective view showing an EL light emitting unit and power feeding unit of EL light emitting device of the first embodiment.
Figure 3:
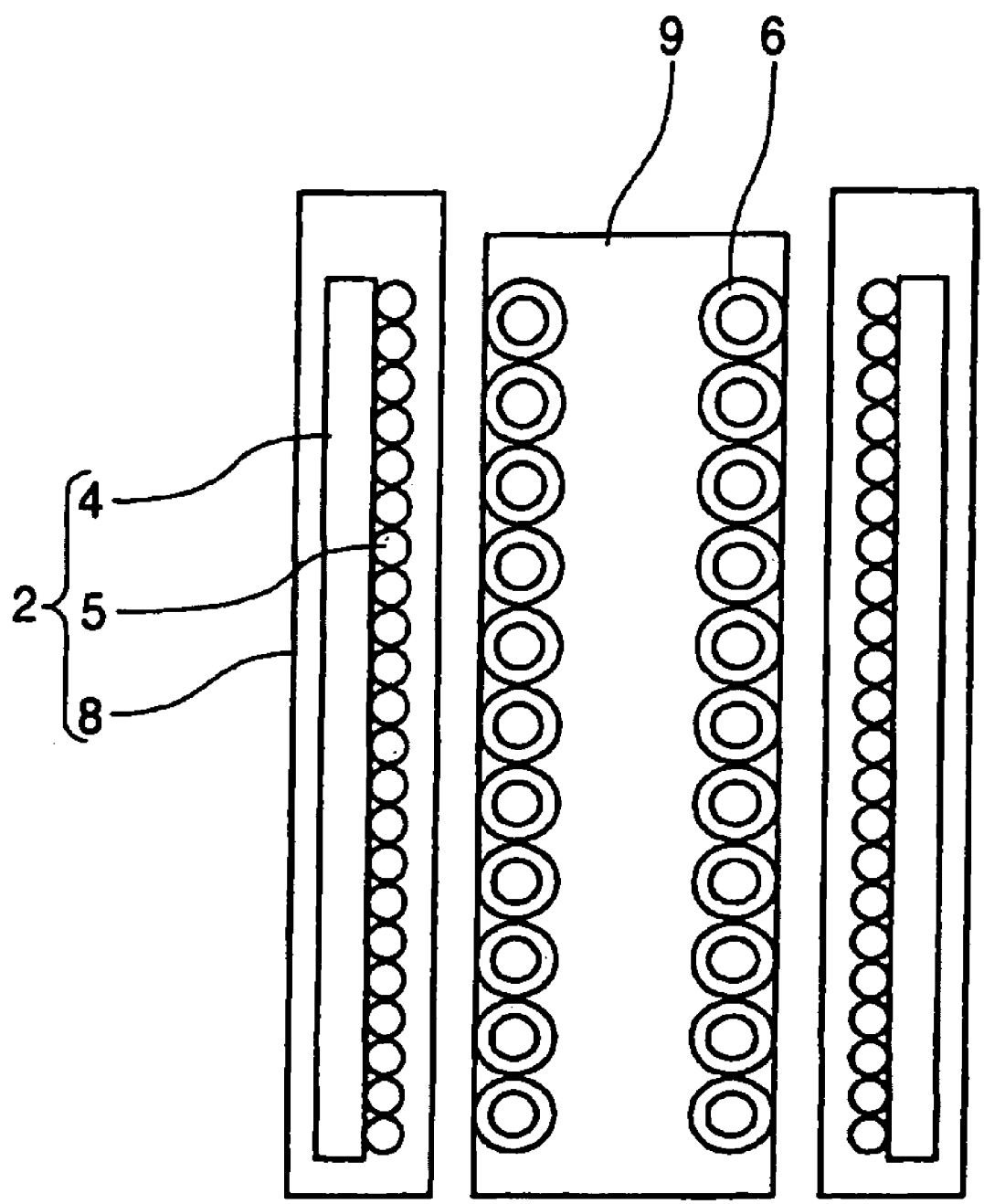
FIG. 3 is a sectional view showing an EL light emitting unit and power feeding unit of EL light emitting device of the first embodiment.

FIG. 2 is a perspective view showing the EL light emitting unit 2, the feeder coil 6 of the power feeding unit 3 and the relation of insertion in the case where the EL light emitting unit 2 and the feeder coil 6 are combined with each other. FIG. 3 is a sectional view showing the EL light emitting unit 2 and the feeder coil 6 of the power feeding unit 3 inserted into the EL light emitting unit 2.

The light emitting element 4 of the EL light emitting unit 2 is formed in a cylindrical shape (In this case, the cylindrical shape means to be hollow.), and the entire face of the outer circumferential face of the light emitting element 4 is a light emitting displaying section. The receiver coil 5 is cylindrically arranged along the inner circumferential face of the cylindrical EL light emitting element 4 all over the length of the cylindrical EL light emitting element 4 in the axial direction. Both end portions of the receiver coil 5 are respectively connected to two electrodes of the EL light emitting element 4.

The EL light emitting element 4 and the receiver coil 5 are entirely covered with the cylindrical outer cover member 8 and integrated into a single body. It is preferable that the outer cover member 8 is made of moisture-proof material such as resin. Specifically, the outer cover member 8 is made of polyester, PEP, PP, epoxy or laminated material of one of these materials and nylon. The outer cover member 8 isolates the EL light emitting element 4 from moisture so as to prevent the light emitting layer from being deteriorated. At the same time, the outer cover member 8 has a function of protecting and insulating the receiver coil 5 in which a high AC voltage is generated by electromagnetic induction. Since the outer cover member 8 is transparent, there is no possibility that the visualization on the luminous display face of the EL light emitting element 4 is obstructed. The outer cover member 8 must have a light transmission property, however, the outer cover member 8 is not necessarily transparent. According to the use, the outer cover member 8 may be colored-transparent so as to have a necessary filtering function.

The feeder coil 6 of the power feeding unit 3 is formed in a cylindrical shape by winding. The length of the cylindrical shape in the axial direction is substantially the same as the length of the receiver coil 5 in the same direction. The entire cylindrical feeder coil 6 is covered with the columnar (solid) outer cover member 9 and integrated into a single body. The outer cover member 9 is made of resin and has a function of protecting and insulating the feeder coil 6 in which an AC voltage is generated. The outer diameter of the feeder coil 6 is substantially the same as that of the outer cover member 9, and the feeder coil 6 is located at a position where the feeder coil 6 substantially comes into contact with a circumferential face of the outer cover member 9. The outer diameters of the outer cover member 9 and the feeder coil 6 are a little smaller than the inner diameter of the outer cover member 8 for covering the receiver coil 5. Therefore, the feeder coil 6 is inserted into the receiver coil 5 and located at a position where the feeder coil 6 comes close to the receiver coil 5. A relation between the power feeding unit 8 and the outer cover member 9 can be changed when necessary, and a dimensional and positional relation between the feeder coil 6 and the receiver coil 5 can be also changed when necessary.

Next, referring to the circuit diagram of FIG. 1 and the wave-form diagrams of FIGS. 4A through 4E, explanations will be made into the specific structure and the action of the power feeding section 7 of the power feeding unit 3 to drive the feeder coil 6.

As shown in FIG. 1, the power feeding section 7 includes: a power source circuit 10 (or a battery to be used as a power source); an oscillating circuit 11 for generating a signal which becomes a reference of the drive signal; a dividing circuit 12 for converting a signal sent from the oscillating circuit 11 into a drive signal when necessary; and a timer circuit 13 which is a timer means for outputting a timer signal.

The power feeding section 7 further includes a current detection circuit 14 for detecting whether or not a predetermined current is flowing in the feeder coil 6. The current detection circuit 14 is composed such that a current of a predetermined value, which becomes a reference, sent from the constant voltage circuit and a current flowing in the feeder coil 6 are compared with each other, and when the current flowing in the feeder coil 6 is not more than the predetermined value, a detection signal is outputted.

Furthermore, the power feeding section 7 includes a drive circuit 15 for alternately driving the feeder coil 6. This drive circuit 15 has two sets of the drive unit circuits composed of transistors which are a plurality of switching elements. When the two sets of the drive unit circuits are driven by drive signals which are inverse to each other, an alternating voltage is given to the feeder coil 6.

A drive signal to drive this drive circuit 15 is given by a detection signal sent from the current detection circuit 14, also given by an output of OR circuit 16 into which a signal sent from the timer circuit 13 is inputted and also given by an output of AND circuit 17 into which a signal sent from the dividing circuit 12 is inputted.

As shown in FIG. 4A, according to the constitution of the power feeding section 7 described above, the feeder coil 6 is intermittently driven by a signal given from the timer circuit 13 for detecting the proximity of the receiver coil 5 (the presence of EL light emitting unit 2). When the feeder coil 6 and the receiver coil 5 are separate from each other, a current, the intensity of which is not less than a predetermined value, flows in the feeder coil 6. Therefore, an inverse signal of the output from the current detection circuit 14 (see FIG. 4B) and an output of OR circuit 16, into which a signal is inputted from the timer circuit 13, become intermittent signals given by the timer circuit 13. Accordingly, driving of the feeder coil 6 is stopped in a predetermined period of time.

When EL light emitting unit 2 is set in a predetermined arrangement with respect to the power feeding unit 3, that is, when the feeder coil 6 and the receiver coil 5 are set at a predetermined state in which the feeder coil 6 and the receiver coil 5 tightly come close to each other, only a current, the intensity of which is not more than a predetermined value, flows in the feeder coil 6. Therefore, a driving action of the power feeding coil is held by flip-flop (F/F) circuit 18 for holding. Accordingly, the signal shown in FIG. 4C is outputted from F/F circuit 18 for holding and given to AND circuit 17 via OR circuit 16. On the other hand, a signal sent from the dividing circuit 12, which measures the time of AC drive, is also given to AND circuit 17. Accordingly, a drive signal is given from AND circuit 17 to the drive circuit 15 at a predetermined drive timing, so that the feeder coil 6 can be alternately driven.

As shown in FIG. 4D, when the feeder coil 6 is driven, an alternating voltage, which is higher than the drive voltage of the feeder coil 6, is generated in the receiver coil 5 according to the turn ratio of the feeder coil 6 and the receiver coil 5.

Therefore, as shown in FIG. 4E, EL light emitting element 4 of EL light emitting unit 2 is turned on. In this embodiment, alternating power of several kHz to several tens kHz is supplied to the feeder coil 6. Incidentally, it is necessary that the turn ratio of the feeder coil 6 to the receiver coil 5 is not less than 1 to 10. It is preferable that the turn ratio of the feeder coil 6 to the receiver coil 5 is in the range from 1 to 30 to 1 to 200.

According to this embodiment, only when the entire power feeding unit 3 is inserted into EL light emitting unit 2, a current, the intensity of which is not less than a predetermined value, flows in the feeder coil 6, so that EL light emitting unit 2 can be driven. Since light is emitted from the entire outer circumferential face of the cylindrical EL light emitting unit 2, it is possible to visualize the emitted light in all directions. Therefore, this device can applied to various uses by utilizing this effect.

An applied example of EL light emitting device 1 of this embodiment to a game will be described as follows. With respect to a large number of columnar protruding rods which are longitudinally and laterally arranged on a board by a predetermined arrangement, cylindrical pieces are inserted and arranged according to a rule of the game. In this game, the cylindrical EL light emitting unit 2 is provided in each piece, and each protruding rod on the board is a columnar power feeding unit 3 of this embodiment. In this case, when the dimensions of the feeder coil 6 (the protruding rod) and the receiver coil 5 (the piece) are appropriately determined so that the feeder coil 6 can be engaged with the receiver coil 5 and when the electric characteristics of the feeder coil 6 and the receiver coil 5 are appropriately determined, in the case where the piece is inserted into the protruding rod on the board, only when a prescribed piece is inserted to a predetermined protruding rod, light is emitted from the piece so that a predetermined display can be conducted. Therefore, a player can be given a strong visual effect and attracted by the game.

Figure 5:
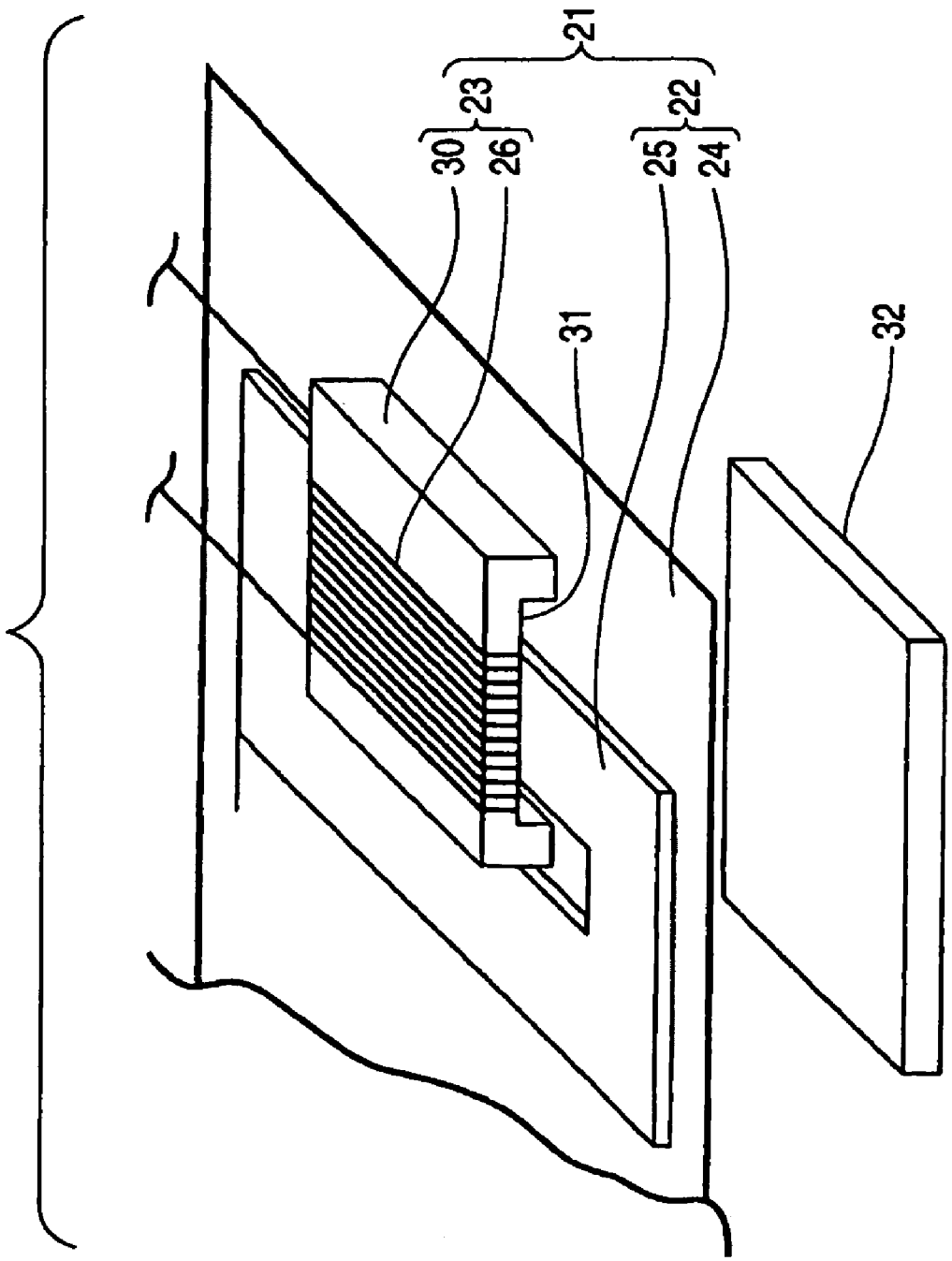
FIG. 5 is a perspective and sectional view of EL light emitting device of the second embodiment.
Figure 6:
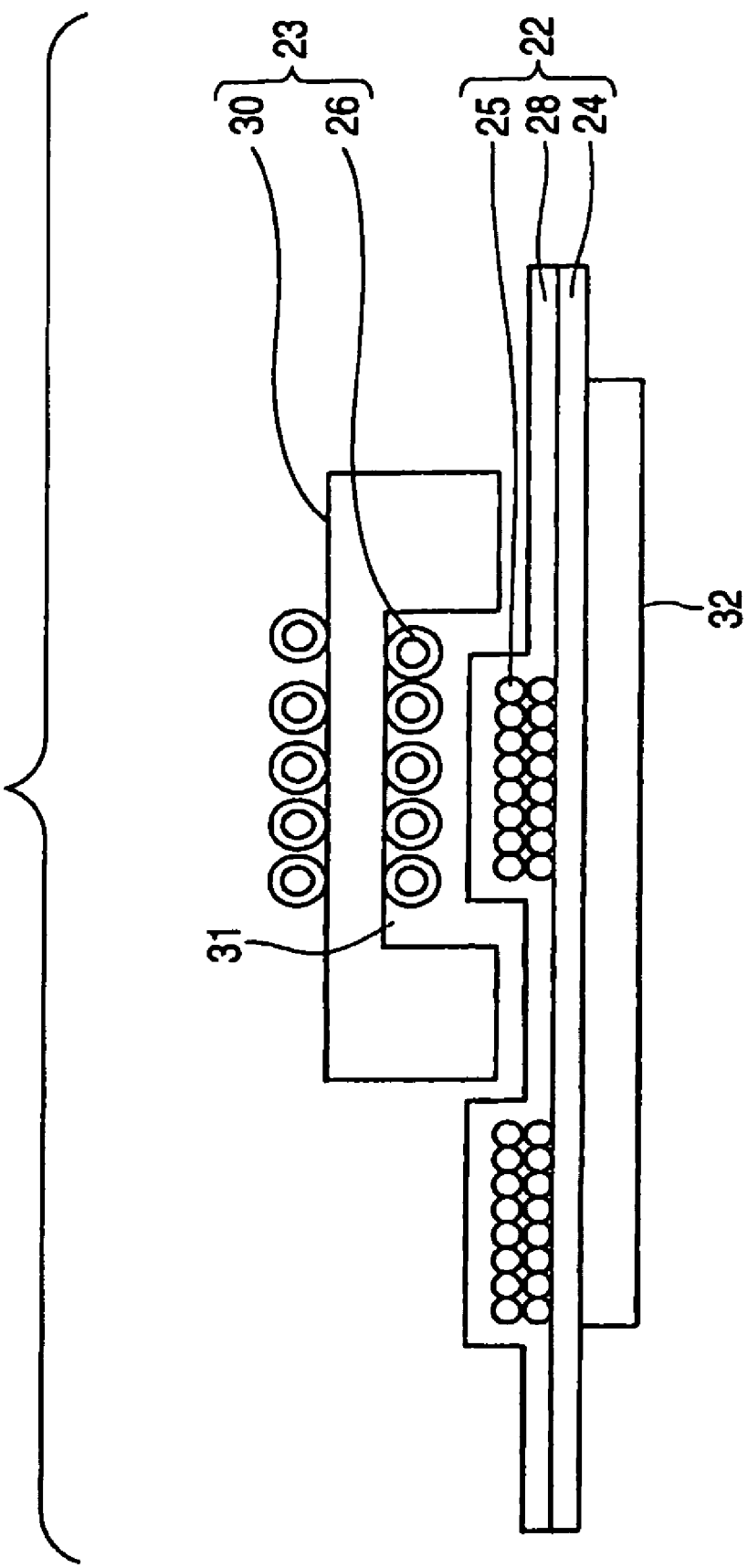
FIG. 6 is a sectional view of EL light emitting device of the second embodiment.

(2) Second Embodiment (FIGS. 5 and 6)

FIG. 5 is a perspective view of EL light emitting device 21 of the present embodiment, and FIG. 6 is a sectional view of the same.

EL light emitting device 21 of the present embodiment includes: a flat plate-shaped or film-shaped EL light emitting unit 22; and a block-shaped feeding unit 23, which is composed as a different body from EL light emitting unit 22, having no mechanical connecting relation with EL light emitting unit 22.

In EL light emitting unit 22 of the present embodiment, the receiver coil 25 is arranged along one face of the sheet-shaped EL light emitting element 24. Both the sheet-shaped EL light emitting element 24 and the receiver coil 25 are integrated with each other into a single body by the outer cover member 28 the shape of which is like a sheet.

The power feeding unit 23 of this embodiment includes a feeder coil 26 wound around the recess portion 31 of the magnetic body 30 having the recess portion 31. The power feeding section 7, the structure and function of which are the same as those of the first embodiment, is connected to this feeder coil 26. In FIG. 5, the power feeding section 7 is omitted.

The magnetic body 30 is arranged on one face of EL light emitting unit 22 so that a part of the receiver coil 25 of EL light emitting unit 22 can be accommodated in the recess portion 31 of the magnetic body 30 of the power feeding unit 23, and the magnetic body 32 for connecting the magnetic field, which is larger than the magnetic body 30, is arranged on the other face of EL light emitting unit 22. Then, both the magnetic bodies 30, 32 are attracted to each other by a magnetic force so that EL light emitting unit 22 can be pinched between them. When the feeder coil 26 is driven in this constitution, a higher alternating voltage than the alternating voltage of the feeder coil 26 is generated in the receiver coil 25, and the sheet-shaped EL light emitting element 24 can be lit.

From the viewpoint of efficiency, it is advantageous that the magnetic body 32 for connecting the magnetic field is larger than the magnetic body of the feeder coil 26, however, the shape of the magnetic body 32 for connecting the magnetic field is not particularly limited. According to this embodiment, compared with the first embodiment, a portion in which the feeder coil 26 and the receiver coil 25 are closely contacted with each other can be reduced. Therefore, the size of the feeder coil 26 can be decreased so as not to be striking.

As an applied example of EL light emitting device 21 of the present embodiment, for example, it is possible to consider that EL light emitting unit 22 is made into a card size so as to be used as a credit card or prepaid card for various uses. In this case, the power feeding unit 23 is provided on the card reader side. When a user of the card holds up the card over the power feeding unit 23 of the card reader, EL light emitting element 24 built in the card conducts a predetermined display by emitting light. At the same time, the card reader reads or rewrites a content stored on the card. In the case where EL light emitting element 24 does not conduct a predetermined display by emitting light, it is decided that the content stored on the card is not read out or rewritten. In this case, the user can adjust a position of the card with respect to the card reader while watching the light emitted from the card.

Another applied example of EL light emitting device 21 of the present embodiment will be described as follows. In a card game in which cards are arranged on a board, on which the predetermined arrangement frames are drawn, according to a rule, each card includes a sheet-shaped EL light emitting unit 22 of the present embodiment, and the power feeding unit 23 is provided on the reverse side of each arrangement frame on the board. If the electric characteristics and arrangements of the feeder coil 26 and the receiver coil 25 are appropriately determined, only when a prescribed card is put in the predetermined arrangement frame in the predetermined direction, the card emits light so that a predetermined display can be conducted. Due to the foregoing, a player can be given a strong visual influence and attracted by the game.

(3) Third Embodiment (FIGS. 7 to 10)

Figure 7:
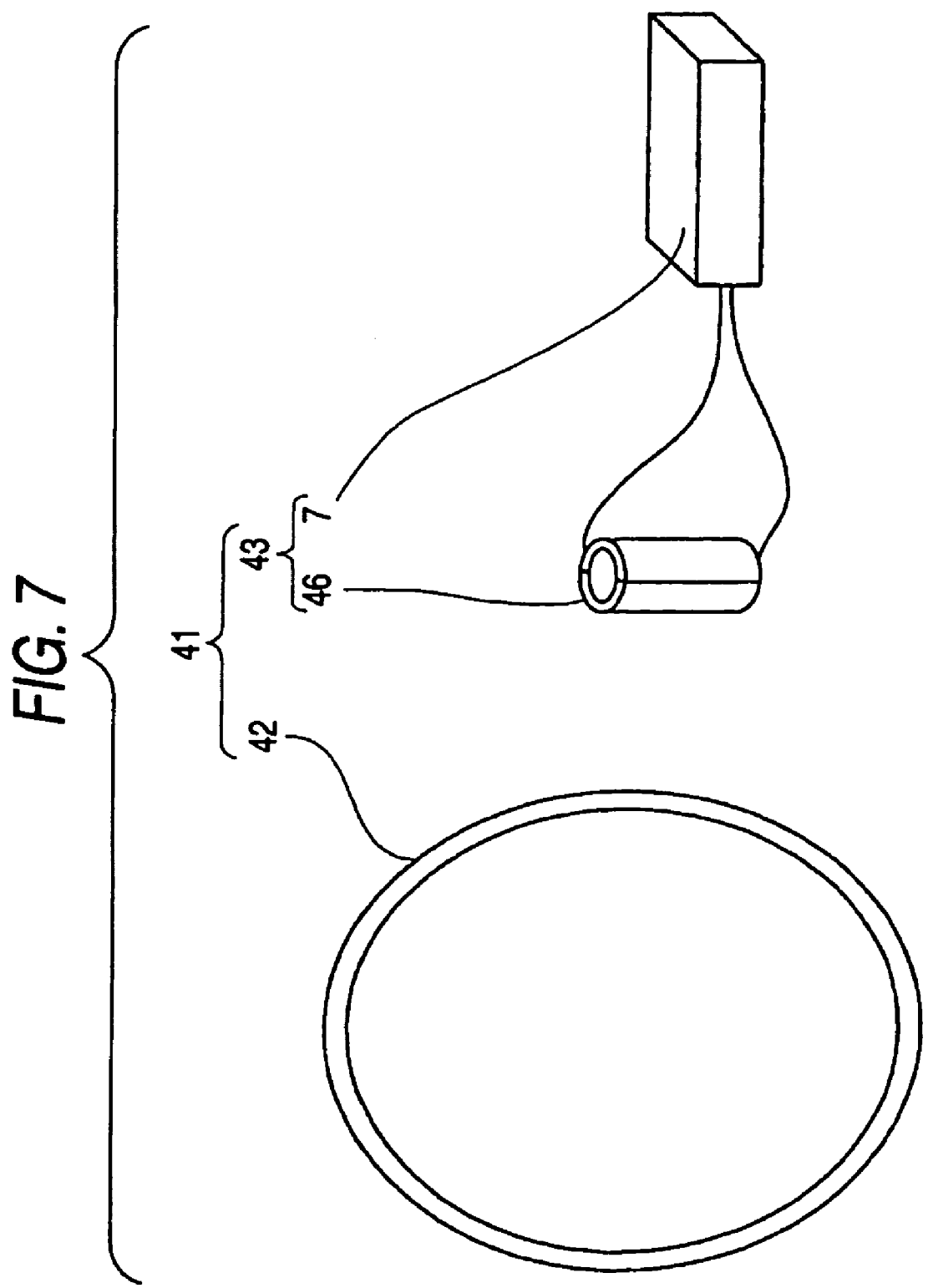
FIG. 7 is a perspective view of EL light emitting device of the third embodiment, wherein this view shows a state in which EL light emitting unit and the power feeding unit are separate from each other.

FIG. 7 is a view showing EL light emitting device 41 of the present embodiment, that is, FIG. 7 is a perspective view showing a state in which EL light emitting unit 42 and the power feeding unit 43 are separate from each other.

EL light emitting device 41 of this embodiment includes: an annular EL light emitting unit 42; and a power feeding unit 43 having a cylindrical feeder coil 46, which slidably covers the annular EL light emitting unit 42 from the outside, and also having a power feeding section 7.

Figure 8:
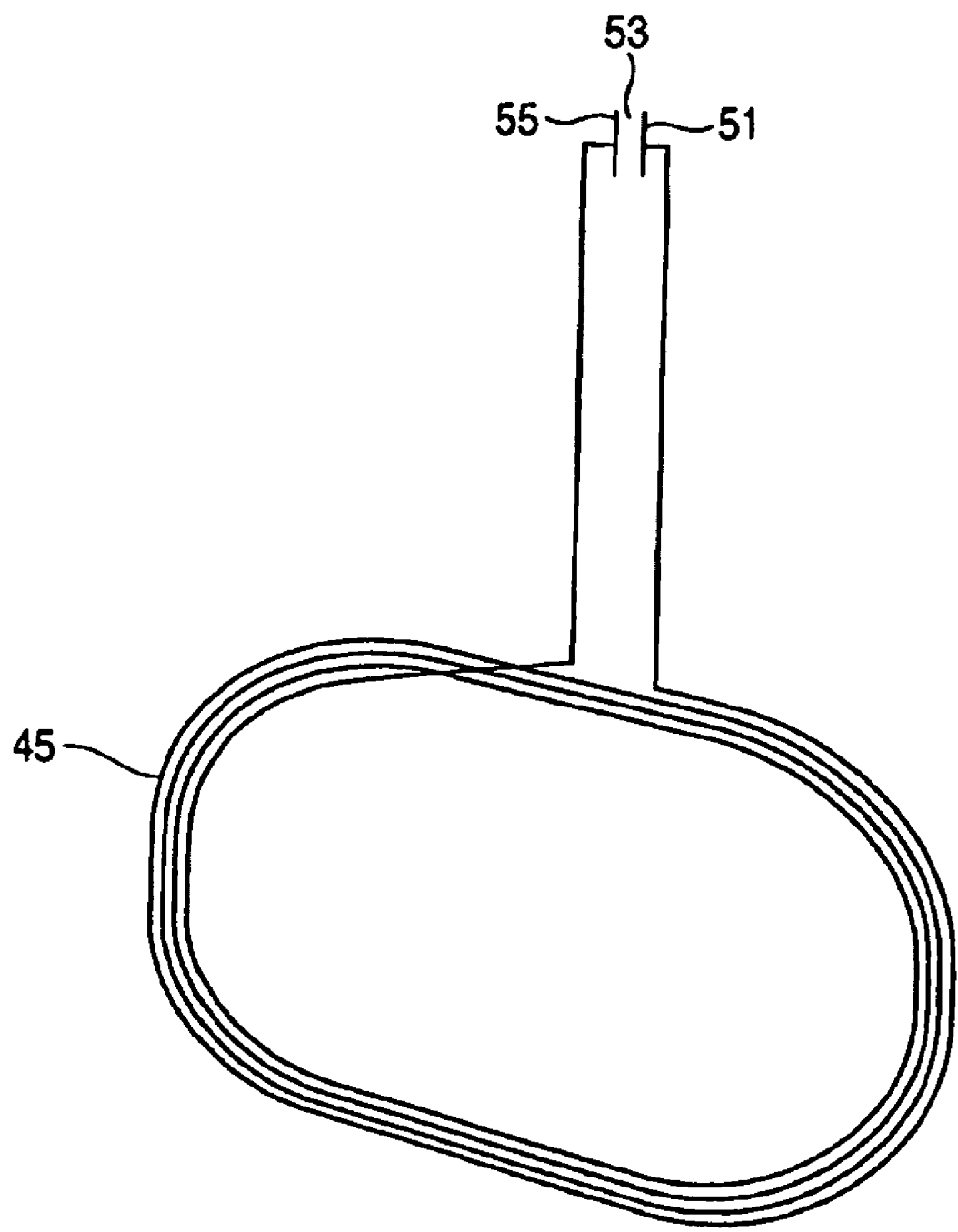
FIG. 8 is a perspective view showing a receiver coil of EL light emitting unit in EL light emitting device of the third embodiment.
Figure 9:
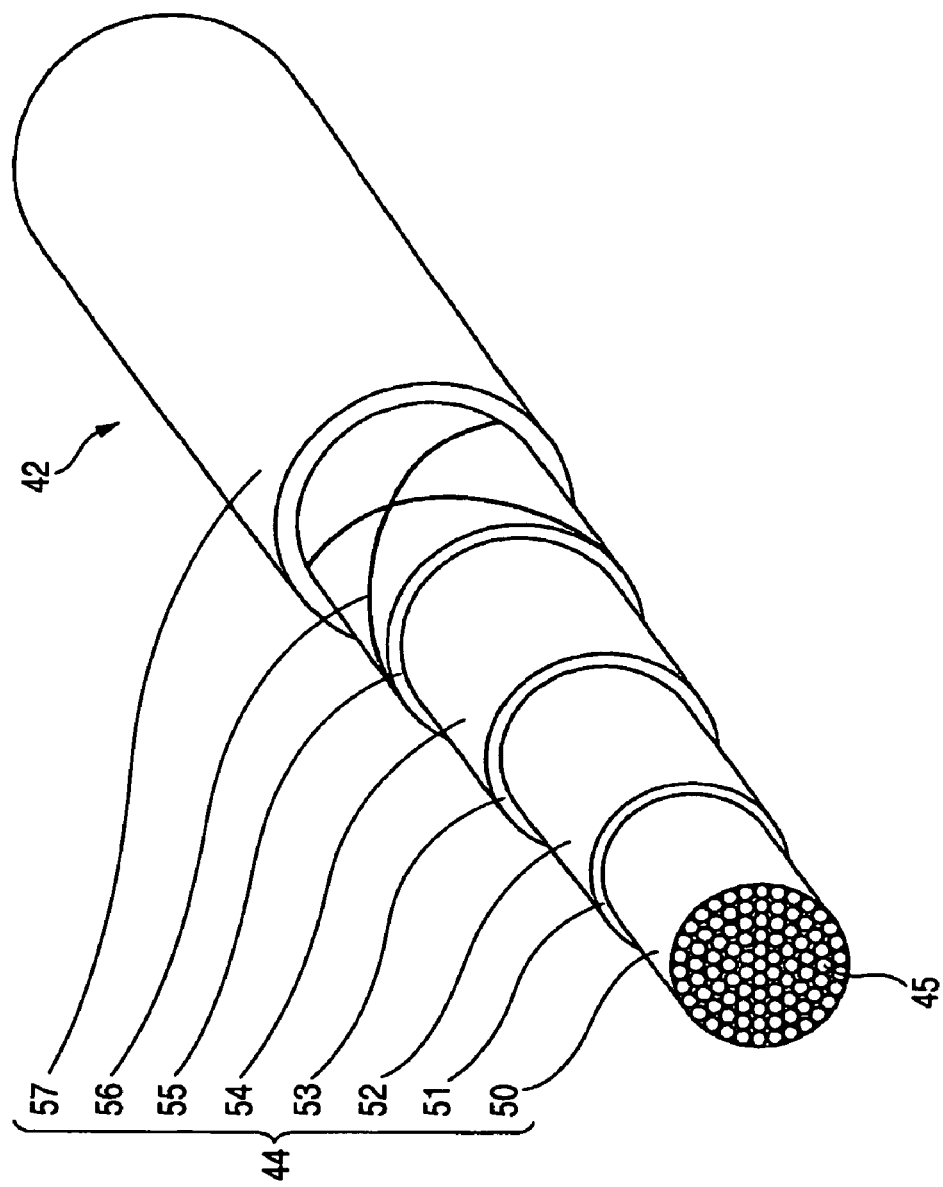
FIG. 9 is an enlarged cutout perspective view of EL light emitting unit of EL light emitting device of the third embodiment.

FIG. 8 is a perspective view of the receiver coil 45 of EL light emitting unit 42, and FIG. 9 is a cutout enlarged view of EL light emitting unit 42.

As shown in FIG. 8, EL light emitting unit 42 of this embodiment has a receiver coil 45 formed such that one lead wire is wound a large number of times by the substantially same diameter so that an annular body can be formed. The number of turns of the receiver coil 45 is determined by the voltage supplied from the power feeding section 7 and the number of turns of the feeder coil 46. The size of the lead wire of the receiver coil 45 is determined by the diameter of EL light emitting element 44 described later, which is finally demanded, also determined by the number of turns of the receiver coil 45 and also determined by the flexibility of EL light emitting element 44 demanded.

As the enlarged cross section is shown in FIG. 9, in EL light emitting unit 42 of this embodiment, the integral EL light emitting element 44 is woven into the periphery of the receiver coil 45. To be specific, on the surface (the outer circumferential face) of the annular body of the receiver coil 45, a central electrode 51 is provided via the insulating layer 50 (the dielectric layer). The central electrode 51 is made of conductive material such as a metallic vapor-deposition film.

On the surface of the central electrode 51, a light emitting layer 53 is provided via the insulating layer 52. The light emitting layer 53 is made of EL material containing electroluminescence powder dispersed in epoxy resin. An example of the electroluminescence powder is ZnS (zinc sulfide).

On the surface of the light emitting layer 53, a transparent electrode 55 is provided via the insulating layer 54. The transparent electrode 55 is made of conductive material having a transparence property. Examples of the conductive material are ITO, IZO, tin oxide, zinc oxide, a translucent film of gold and a conductive high polymer.

On the surface of the transparent electrode 55, the resistance of which is high, in order to ensure the electric continuity, a plurality of linear additional electrodes 56 are spirally wound so that the linear additional electrodes 56 can cross each other. An example of the additional electrode 56 is a copper wire.

The outer cover member 57 having a transparency property and flexibility is provided such that the outer cover member 57 covers the transparent electrode 55 and the additional electrode 56. An example of the outer cover member 57 is a high polymer outer cover member.

One end of the receiver coil 45 is connected to the central electrode 51, and the other end of the receiver coil 45 is connected to the additional electrode 56.

According to the above constitution, EL light emitting unit 42 of this embodiment is completely formed in an integrated ring shape and has no electrically contacting portions with the outside. In this embodiment, all the circumferential surface of the ring-shaped EL light emitting unit 42 is luminous.

Figure 10:
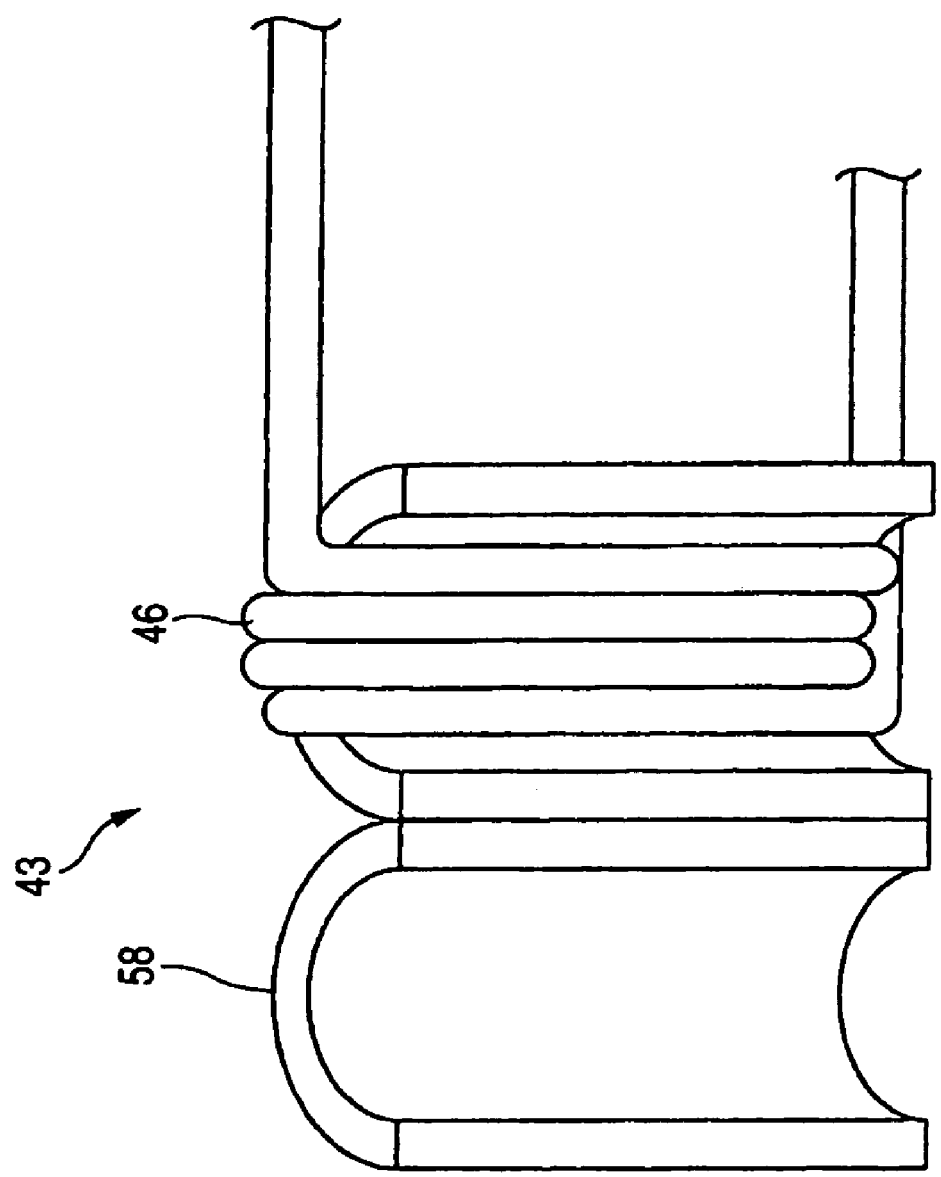
FIG. 10 is an enlarged perspective view of a feeder coil of the power feeding unit of EL light emitting device of the third embodiment.

FIG. 10 is an enlarged perspective view of the feeder coil 46 of the power feeding unit 43. In this embodiment, the feeder coil 46 is wound around one side or both sides (One side is illustrated in the case shown in the drawing.) of the cylindrical core 58 (split core) of the spilt structure consisting of two splits capable of being attached to the annular EL light emitting unit 42 from the outside. Accordingly, the feeder coil 46 can be slid with respect to EL light emitting unit 42. Therefore, the feeder coil 46 can be moved along the annular EL light emitting unit 42 and set at an arbitrary position in the circumferential direction of EL light emitting unit described before. As shown in FIG. 7, this feeder coil 46 is connected with the power feeding section 7 having the same structure and function as those shown in the first embodiment. In FIG. 10, the power feeding section 7 is omitted.

Figure 11:
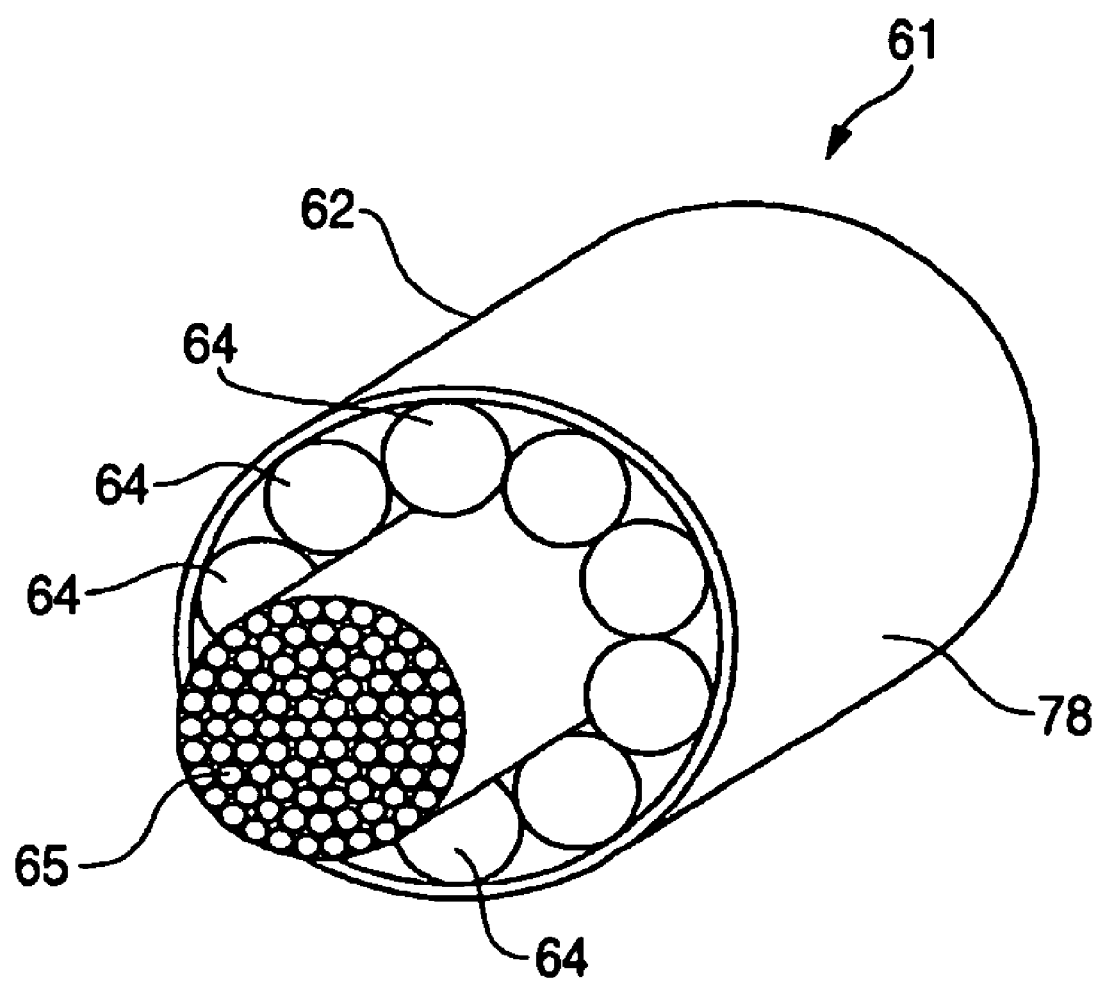
FIG. 11 is an enlarged cutout perspective view of EL light emitting unit of EL light emitting device of the third embodiment.
Figure 12:
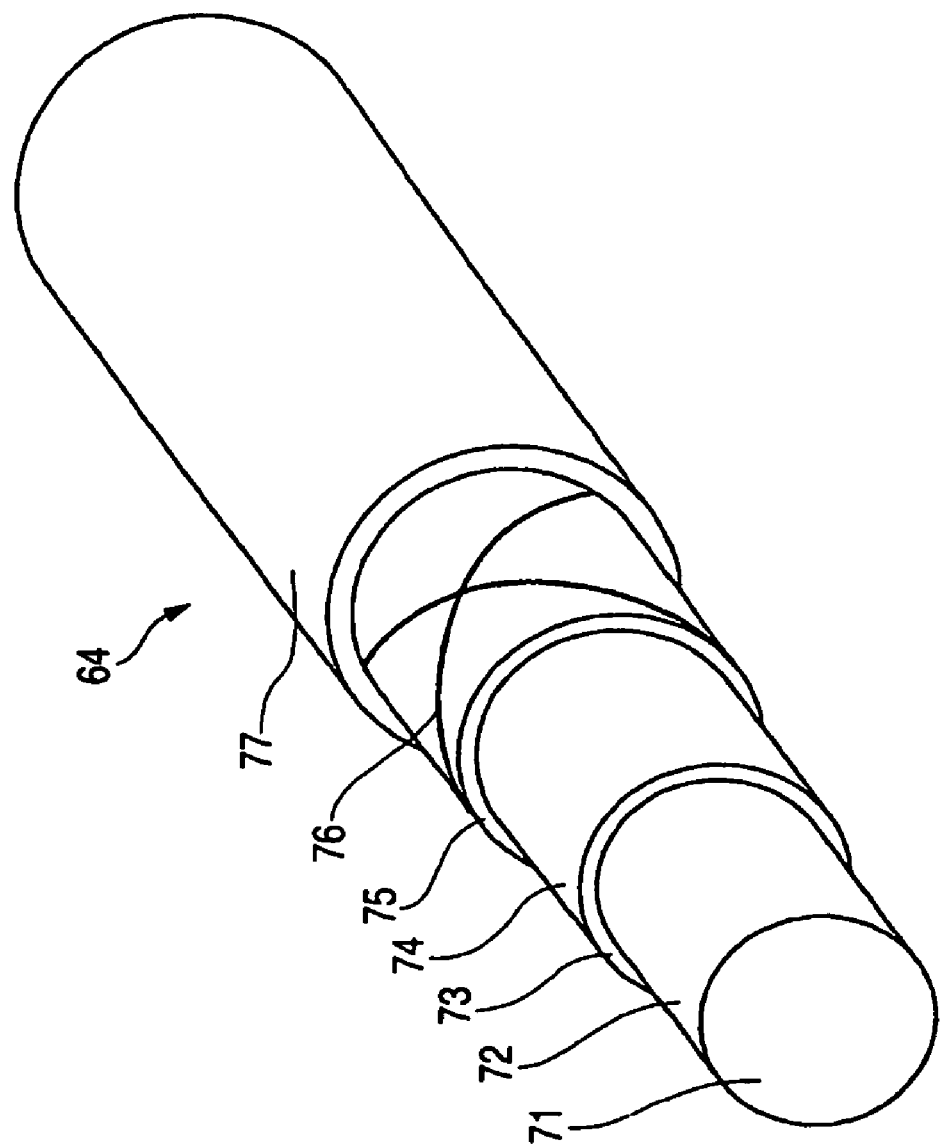
FIG. 12 is an enlarged cutout perspective view of one EL light emitting element of EL light emitting device of the third embodiment.

(4) Fourth Embodiment (FIGS. 11 and 12)

The overall arrangement of EL light emitting device 61 of this embodiment is the same as that of the third embodiment shown in FIG. 7. However, in the arrangement, the structure of EL light emitting unit 62 is different. FIG. 11 is an enlarged perspective view of a cutting plane of EL light emitting unit 62 of EL light emitting device 61 of this embodiment.

As shown in FIG. 11, EL light emitting unit 62 of this embodiment includes a receiver coil 65 formed such that one lead wire is wound around the same diameter a large number of times so as to compose an annular body. This point of this embodiment is the same as the third embodiment shown in FIG. 8. In the periphery of the annular body of this receiver coil 65, the linear EL light emitting elements 64 are densely arranged. The longitudinal direction of the linear EL light emitting elements is the same as the winding direction of the receiver coil 65, and the linear EL light emitting elements 64 are arranged in the circumferential direction of the receiver coil 65.

FIG. 12 is an enlarged perspective view of the linear EL light emitting element 64 shown in FIG. 11. The linear EL light emitting element 64 includes: a central electrode 71; a light emitting layer 73 provided on the surface of the central electrode 71 via the insulating layer 72; a transparent electrode 75 provided on the surface of the light emitting layer 73 via the insulating layer 74; an additional electrode 76 wound around the surface of the transparent electrode 75; and an outer cover member 77 for covering the transparent electrode 75 and the additional electrode 76.

One end of the receiver coil 65 is connected to the central electrode 71 of EL light emitting element 64, and the other end of the receiver coil 65 is connected to the additional electrode 76 of EL light emitting element 64. Further, as shown in FIG. 11, EL light emitting elements 64, which are arranged side by side, and the receiver coil 65 are covered with an outer cover member 78 having a transparence property.

In this embodiment, the linear EL light emitting elements 64, which are arranged side by side on the circumferential face of the receiver coil 65, are composed such that an EL light emitting element 64 is wound on the circumferential face of the receiver coil 65 a large number of times so as to cover the circumferential face of the receiver coil 65. Therefore, a connecting point is provided at which one end of the receiver coil 65 and the central electrode 71 of EL light emitting element 64 are connected to each other, and the other connecting point is provided at which the other end of the receiver coil 65 and the additional electrode 76 of EL light emitting element 64 are connected to each other.

However, it is possible to adopt the structure in which a large number of the linear EL light emitting elements 64, which are respectively formed in a loop, are prepared and these loop-shaped linear EL light emitting elements 64 are arranged on the circumferential face of the receiver coil 65. In this case, it is necessary that a end of the receiver coil 65 is respectively connected to the central electrodes 71 of the plurality of EL light emitting elements 64 and the other end of the receiver coil 65 is respectively connected to the additional electrodes 76 of the plurality of EL light emitting elements 64.

The constitution and the action of the power feeding unit of this embodiment are the same as those of the third embodiment. Therefore, the explanations are omitted here.

As an applied example of EL light emitting devices of the third and the fourth embodiment, since the entire circumferential face of the annular EL light emitting unit 42, 62 is luminous and it is possible to provide a high decorative effect by the annular EL light emitting unit 42, 62, it is most appropriate to use the annular EL light emitting unit 42, 62 for the electric decoration at the times of various events. In this case, since the feeding unit 43 can be arbitrarily arranged with respect to EL light emitting unit 42, 62, EL light emitting unit 42, 62 can be easily decorated for the object of decoration.

What is claimed is:

1. An EL light emitting unit comprising:
    an EL light emitting element; and
    a power receiving coil connected to the EL light emitting element by electromagnetic induction so that a predetermined AC current is induced therein,
    wherein the EL light emitting element and the power receiving coil are integrated with each other, and the EL light emitting element and the power receiving coil are entirely sealed by a first outer cover member.

2. An EL light emitting unit according to claim 1, wherein the EL light emitting element is formed in a cylindrical shape, the power receiving coil is formed in a cylindrical shape being arranged along an inner circumferential face of the EL light emitting element and the first outer cover member is formed in a cylindrical shape for covering entirely the EL light emitting element and the power receiving element.

3. An EL light emitting unit according to claim 1, wherein the EL light emitting element is formed in a sheet-shape, the power receiving coil is arranged along a surface of the EL light emitting element and the first outer cover member is formed in a sheet-shape for covering entirely the EL light emitting element and the power receiving element.

4. An EL light emitting unit according to claim 1, wherein the power receiving coil is formed in an annular body, the EL light emitting element is formed in an annular-shape along the power receiving coil so that the EL light emitting element covers a surface of the annular body of the power receiving coil.

5. An EL light emitting unit according to claim 4, wherein the EL light emitting element includes:
    a central electrode provided on a surface of the annular body of the power receiving coil via an insulating layer;
    a light emitting layer provided on a surface of the central electrode via an insulating layer;
    a transparent electrode provided on a surface of the light emitting layer via an insulating layer;
    an additional electrode wound around a surface of the transparent electrode; and
    the first outer cover member for covering the transparent electrode and the additional electrode;
    wherein one end of the power receiving coil is connected to the central electrode, and another end of the power receiving coil is connected to the additional electrode.

6. An EL light emitting unit according to claim 4, wherein a plurality of the EL light emitting elements are provided, each of which includes a linear structure comprising:
    an annular central electrode;
    a light emitting layer provided on a surface of the central electrode via an insulating layer;
    a transparent electrode provided on a surface of the light emitting layer via an insulating layer;
    an additional electrode wound around a surface of the transparent electrode; and
    a second outer cover member for covering the transparent electrode and the additional electrode,
    wherein the EL light emitting elements are densely arranged in a circumferential direction along a surface of the annular body of the power receiving coil,
    one end of the power receiving coil is connected to the central electrodes of the EL light emitting elements, another end of the power receiving coil is connected to the additional electrodes of the EL light emitting elements, and the EL light emitting elements and the power receiving coil are covered with the first outer cover member.

7. A power feeding unit comprising:
a power feeding coil connected to an EL light emitting element by electromagnetic induction so that a predetermined AC current is induced therein, wherein the power feeding coil is formed in a columnar shape whose diameter is smaller than an inner diameter of a power receiving coil so that the power feeding coil is insertable into the power receiving coil which is formed in a cylindrical shape; and
a power feeding section for providing an AC current to the power feeding coil.

8. A power feeding unit comprising:
a power feeding coil connected to an EL light emitting element by electromagnetic induction so that a predetermined AC current is induced therein, wherein the power feeding coil is wound around a magnetic body having a recess portion, and a part of a sheet-shaped power receiving coil which is wound on a plane is arranged in the recess portion; and
a power feeding section for providing an AC current to the power feeding coil.

9. A power feeding unit comprising:
a power feeding coil connected to an EL light emitting element by electromagnetic induction so that a predetermined AC current is induced therein, wherein the power feeding coil is wound around a split of a cylindrical core which is attachable from outside, and the power feeding coil is movable with respect to a power receiving coil which is formed in an annular body; and
a power feeding section for providing an AC current to the power feeding coil.

10. A power feeding unit comprising:
a power feeding coil connected to an EL light emitting element by electromagnetic induction so that a predetermined AC current is induced therein, wherein the power feeding section is configured to intermittently drive the power feeding coil, and the power feeding coil is continuously driven in a case when a power receiving coil and the power feeding coil come close to each other, in which an electric current not less than or more than a predetermined value flows in the power feeding coil; and
a power feeding section for providing an AC current to the power feeding coil.

11. An EL light emitting device comprising:
an EL light emitting unit in which an EL light emitting element and a power receiving coil are connected to the EL light emitting element so that a predetermined AC current is induced by electromagnetic induction, are integrated with each other; and
a power feeding unit having a power feeding coil, which induces the predetermined AC current in the power receiving coil of the EL light emitting unit by electromagnetic induction, and a power feeding section for giving an AC current to the power feeding coil,
wherein the EL light emitting element and the power recieving coil are entirely sealed by a first outer cover member.

12. An EL light emitting device according to claim 11, wherein
the EL light emitting element in the EL light emitting unit is formed in a cylindrical shape, the power receiving coil is formed in a cylindrical shape being arranged along an inner circumferential face of the EL light emitting element, and the EL light emitting element and the power receiving coil are integrated with each other by a cylindrical first outer cover member, and the power feeding coil in the power feeding unit is formed in a cylindrical shape, whose diameter is smaller than an inner diameter of the power receiving coil so that the power feeding coil is insertable into the power receiving coil formed in a cylindrical shape.

13. An EL light emitting device according to claim 11, wherein the EL light emitting element in the EL light emitting unit is formed in a sheet-shape, and the power receiving coil is arranged along a surface of the EL light emitting element, so that the EL light emitting element and the power receiving coil are integrated with each other by a sheet-shaped first outer cover member, and the power feeding coil in the power feeding unit is wound around a first magnetic body having a recess portion, and the first magnetic body is attracted by a magnetic force to a second magnetic body for coupling magnetic fields which is arranged on an opposite side of the EL light emitting unit;

wherein a part of the power receiving coil is arranged in the recess portion of the first magnetic body.

14. An EL light emitting device according to claim 11, wherein the EL light emitting element in the EL light emitting unit includes a central electrode provided on a surface of the annular body of the power receiving coil which is formed in an annular body via an insulating layer, a light emitting layer provided on a surface of the central electrode via an insulating layer, a transparent electrode provided on a surface of the light emitting layer via an insulating layer, an additional electrode wound around a surface of the transparent electrode, and the first outer cover member for covering the transparent electrode and the additional electrode;

one end of the power receiving coil is connected to the central electrode and another end of the power receiving coil is connected to the additional electrode; and the power feeding coil in the power feeding unit is wound around a split of a cylindrical core being attachable from outside so as to be movable with respect to the annular EL light emitting unit.

15. An EL light emitting device according to claim 11, wherein a plurality of the EL light emitting elements are provided in the EL light emitting unit, each of which is formed in a linear structure including:

an annular central electrode, a light emitting layer provided on a surface of the central electrode via an insulating layer, a transparent electrode provided on a surface of the light emitting layer via an insulating layer, an additional electrode wound around a surface of the transparent electrode, and a second outer cover member for covering the transparent electrode and the additional electrode;

the EL light emitting elements are densely arranged in a circumferential direction on a surface of the annular body of the power receiving coil;

wherein one end of the power receiving coil is connected to the central electrodes of the EL light emitting elements, another end of the power receiving coil is connected to the additional electrodes of the EL light emitting elements; and the EL light emitting elements and the power receiving coil are covered with the first outer cover member;

the power feeding coil in the power feeding unit is wound around a split of a cylindrical core being attachable from outside so as to be movable with respect to the annular EL light emitting unit.

16. An EL light emitting device according to claim 11, wherein a ratio of the number of turns of the power feeding coil to that of the power receiving coil is not less than 1 to 10.

* * * * *